(12) United States Patent
Suzuki (10) Patent No.: US 11,637,958 B2
(45) Date of Patent: Apr. 25, 2023

(54) CONTROL APPARATUS, CONTROL METHOD, AND STORAGE MEDIUM

(71) Applicant: CANON KABUSHIKI KAISHA, Tokyo (JP)

(72) Inventor: Yutaka Suzuki, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/354,154

(22) Filed: Jun. 22, 2021

(65) Prior Publication Data

US 2021/0409607 A1 Dec. 30, 2021

(30) Foreign Application Priority Data

Jun. 25, 2020 (JP) .............................. JP2020-109491

(51) Int. Cl.
*H04N 5/232* (2006.01)
*H04N 5/247* (2006.01)

(52) U.S. Cl.
CPC ..... *H04N 5/23299* (2018.08); *H04N 5/23216* (2013.01); *H04N 5/23296* (2013.01); *H04N 5/247* (2013.01)

(58) Field of Classification Search
CPC .... H04N 5/247; H04N 13/111; H04N 5/2258; H04N 5/23238; H04N 13/275; H04N 5/2171; H04N 5/2628; H04N 5/272
See application file for complete search history.

(56) References Cited

U.S. PATENT DOCUMENTS

| | | | |
|---|---|---|---|
| 2002/0118969 A1 | 8/2002 | Kanade et al. | |
| 2006/0192856 A1 | 8/2006 | Tamura et al. | |
| 2007/0196016 A1* | 8/2007 | Chen | G06T 7/80 382/190 |
| 2021/0243368 A1* | 8/2021 | Park | H04N 5/23232 |

FOREIGN PATENT DOCUMENTS

JP   4010444 B2   11/2007

OTHER PUBLICATIONS

The above patent documents were cited in a European Search Report dated Nov. 16, 2021, which is enclosed, that issued in the corresponding European Patent Application No. 21181368.8.

* cited by examiner

*Primary Examiner* — Samira Monshi
(74) *Attorney, Agent, or Firm* — Cowan, Liebowitz & Latman, P.C.

(57) ABSTRACT

A control apparatus includes an acquisition unit configured to acquire information on a rotation of the first imaging unit in the rotation direction and position information of a designated range designated on a first image imaged by the first imaging unit, a setting unit configured to set the second imaging range so as to include the designated range based on the information on the rotation and the position information, and a control unit configured to control the second imaging unit to instruct the second imaging unit to image the second imaging range and to acquire a second image by changing at least one of the imaging direction and the angle of view of the second imaging unit.

7 Claims, 7 Drawing Sheets

CONTROL APPARATUS, CONTROL METHOD, AND STORAGE MEDIUM

BACKGROUND OF THE INVENTION

Field of the Invention

The present invention relates to a control apparatus, a control method, and a storage medium.

Description of the Related Art

There has recently been known network cameras that can acquire an image in a wider imaging range using a plurality of cameras (referred to as multi-lens cameras hereinafter) than that using a single camera. The multi-lens cameras include a combination of various mechanisms, such as a combination of a plurality of fixed cameras and a zoom camera that can vary an imaging magnification, and a combination of a camera that have a field of view of 360° such as a fisheye lens (referred to as an omnidirectional camera hereinafter) and a zoom camera. The plurality of fixed cameras include cameras that enables a manual adjustment of an angle of view in a rotational direction around a horizontal axis (pan), a vertical axis (tilt), and an optical axis center (rotation), and sets a desired imaging area.

One known illustrative imaging method of the multi-lens camera is a method that connects images acquired from fixed cameras to each other for wide-range imaging (panoramic imaging), and provides high-resolution imaging with zoom cameras having different mechanisms. Japanese Patent No. 4010444 discloses a system that sets an imaging position of an omnidirectional camera so as to coincide it with an imaging position of a zoom camera, and images a position designated by the omnidirectional camera using the zoom camera.

However, the system disclosed in Japanese Patent No. 4010444 needs to designate the position of the zoom camera for each area in the image when the fixed camera portion is the omnidirectional camera. In this case, the area outside the designated position or a plurality of areas cannot be displayed on the zoom camera. This problem occurs even when, for example, the fixed camera has a rotation mechanism and the zoom camera has no rotation mechanism. When the fixed camera pans and/or tilts, an imaging range of the fixed camera can be covered by panning and/or tilting the zoom camera. However, when the fixed camera provides rotation driving, the same angle of view cannot be imaged, because a functional difference between the fixed camera and the zoom camera cannot compensate a difference of a rotated angle.

SUMMARY OF THE INVENTION

The present invention provides a control apparatus, a control method, and a storage medium, each of which can correct and display a positional shift of a designated area from a zoom camera, which is caused by a rotation of a fixed camera.

A control apparatus according to one aspect of the present invention for a first imaging unit rotatable in a rotation direction around an optical axis and configured to image a first imaging range, and a second imaging unit configured to change at least one of an imaging direction and an angle of view and to image a second imaging range that is part of the first imaging range, includes an acquisition unit configured to acquire information on a rotation of the first imaging unit in the rotation direction and position information of a designated range designated on a first image imaged by the first imaging unit, a setting unit configured to set the second imaging range so as to include the designated range based on the information on the rotation and the position information, and a control unit configured to control the second imaging unit to instruct the second imaging unit to image the second imaging range and to acquire a second image by changing at least one of the imaging direction and the angle of view of the second imaging unit. At least one processor or circuit is configured to perform a function of at least one of the units. A control method corresponding to the above control apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Corresponding elements in respective figures will be designated by the same reference numerals, and a duplicate description thereof will be omitted.

First Embodiment

Figure 1:
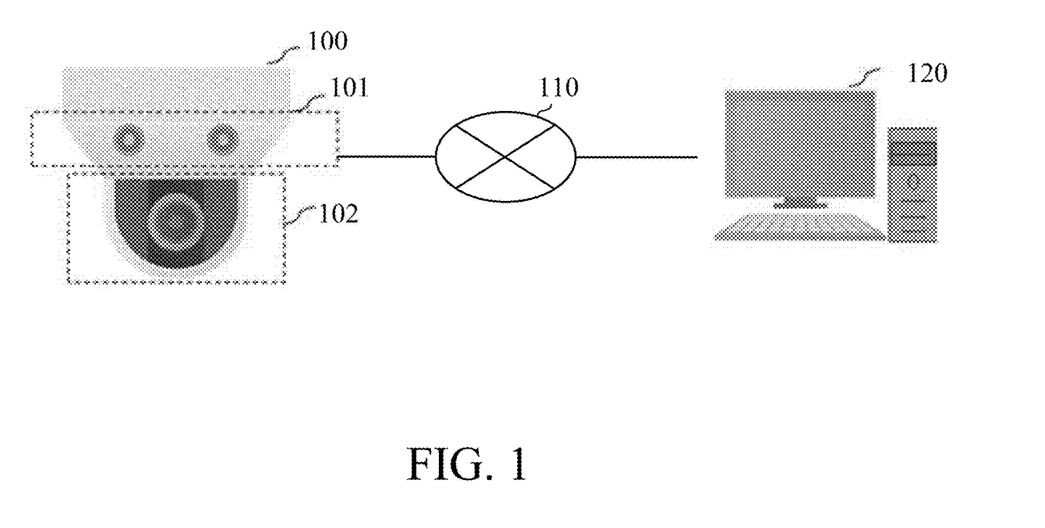
FIG. 1 is a configuration diagram of an imaging system according to a first embodiment.

FIG. 1 is a configuration diagram of an imaging system (surveillance system) according to this embodiment. The imaging system includes an image pickup apparatus 100 installed on a ceiling, a utility pole, or the like, a terminal 120 for displaying an image and various information from the image pickup apparatus 100 and for remotely controlling the image pickup apparatus 100, and a network (IP network network) 110 connecting them with each other. While FIG. 1 illustrates a single image pickup apparatus 100 and a single terminal 120, the number of these devices is not particularly limited.

The image pickup apparatus 100 includes a first imaging unit (multi-lens camera) 101 including a plurality of cameras capable of changing an imaging direction to an arbitrary angle and of fixing it, and a second imaging unit 102 capable of obtaining a high-definition image and of changing the imaging direction and optical zoom magnification in a narrow angle. The pan, tilt, and rotation of each camera in the first imaging unit 101 are individually and manually set. Each camera executes a rotation in the set pan direction, a rotation in the set tilt direction, and a rotation in the set rotation direction, is fixed at an arbitrary angle, and captures an image. The rotation direction refers to a rotating direction around the optical axis as a center. In this embodiment, the plurality of cameras are manually set, but may be automatically set by mounting a motor on a driving unit in each camera. The second imaging unit 102 is remotely controlled by the terminal 120 and can provide at least one of pan, tilt, and zoom that can change an angle of view (at least one of an imaging direction and an angle of view). The second imaging unit 102 can rotate the imaging direction over 360°, and capture an area (second imaging range) included in (or part of) the imaging area (first imaging range) of the first imaging unit 101. The imaging speeds of the first and second imaging units 101 and 102 are set to 15 frames/seconds in this embodiment, but the present invention is not limited to this example.

The image pickup apparatus 100 serves to transmit an acquired image to the terminal 120 on the network 110. The terminal 120 is communicably connected to the image pickup apparatus 100 via the network 110, and serves to display an image received from the image pickup apparatus 100 and to issue various commands to the image pickup apparatus 100.

Figure 2:
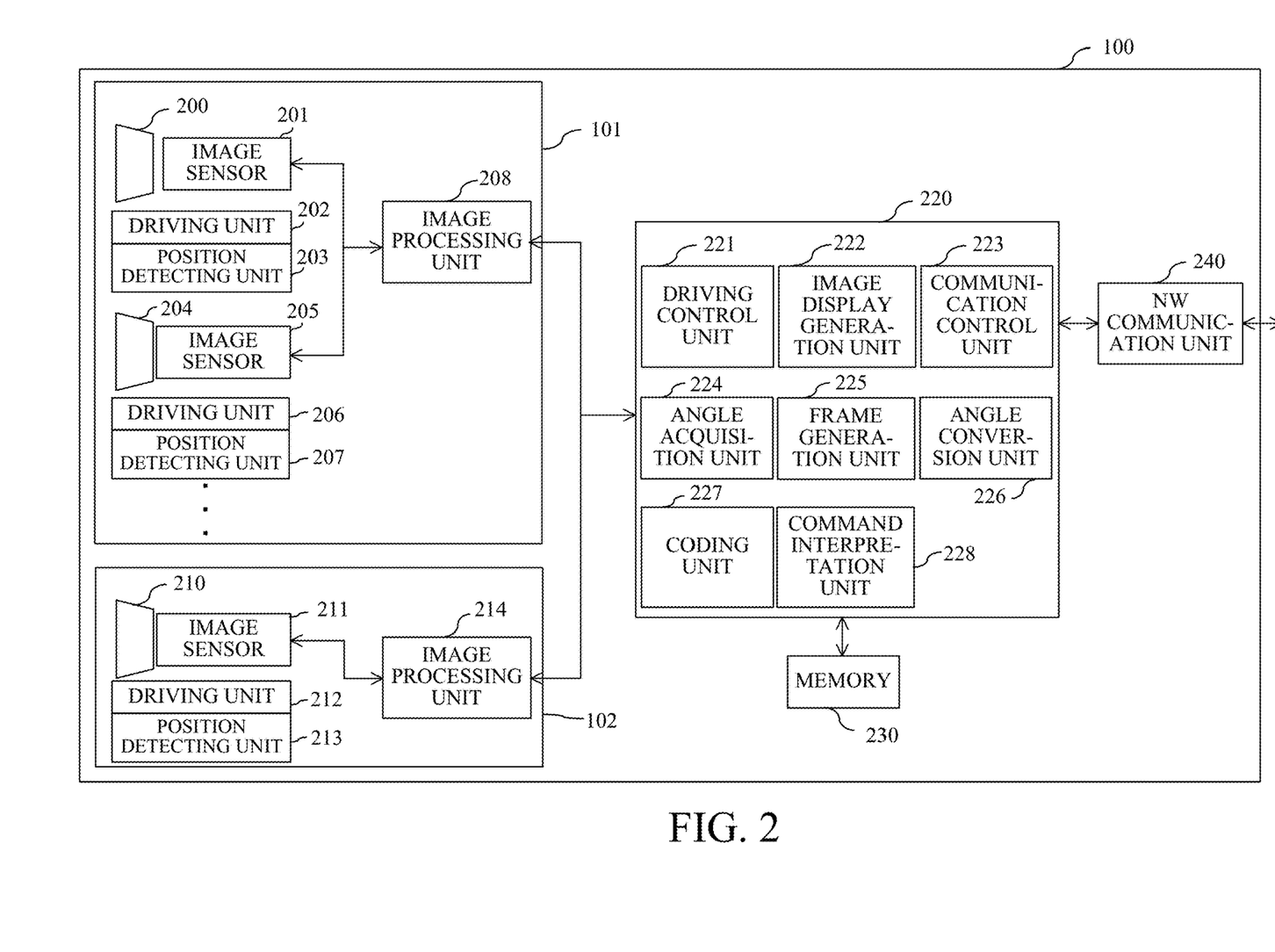
FIG. 2 is a block diagram of an image pickup apparatus according to the first embodiment.

FIG. 2 is a block diagram of the image pickup apparatus 100. The image pickup apparatus 100 includes the first imaging unit 101, the second imaging unit 102, a control unit 220 that controls the first and second imaging units 101 and 102 and processes an acquired image, a memory 230, and a network (NW) communication unit 240 that communicates with the network 110. In this embodiment, the control unit 220 is provided in the image pickup apparatus 100, but may be configured as a control apparatus separate from the image pickup apparatus 100.

The first imaging unit 101 includes imaging optical systems 200 and 204 including a wide-angle lens for acquiring a wide-angle image, image sensors 201 and 205, driving units 202 and 206, position detecting units 203 and 207, and an image processing unit 201. In the first imaging unit 101, a structure including the imaging optical system, the image sensor, the driving unit, and the position detecting unit captures a single imaging area. While FIG. 2 illustrates two structures, the number of structures is not particularly limited. While the imaging optical systems 200 and 204 include a wide-angle lens in this embodiment, they may include a zoom lens, a focus lens, a diaphragm mechanism, or the like.

The imaging optical systems 200 and 204 are arranged so that their optical axes are different from each other, and thus individually capture images in different directions. By arranging the imaging optical systems so that the imaging areas partially overlap each other and by increasing the number of structures, a wide range (or all directions) over 360 degrees can be covered.

The image sensors 201 and 205 include two-dimensional image sensors such as a CCD and CMOS, photoelectrically convert object images formed by the imaging optical systems 200 and 204, and supply the obtained electric signals to the image processing unit 208.

The driving units 202 and 206 can change the imaging directions (optical axis directions) of the first imaging unit 101. This embodiment can fix the first imaging unit 101 at a predetermined angle by manually and individually setting the pan, tilt, and rotation. However, the setting is not limited to the manual setting, and the automatic setting may be made by mounting a motor on the driving unit.

The position detecting units 203 and 207 each include an encoder that detects a mechanical position changes of the driving units 202 and 206, and outputs an electric signal indicating the position information, and supply the acquired electric signals to the image processing unit 208.

The image processing unit 208 converts the electric signals received from the image sensors 201 and 205 into digital data, and performs demosaic processing, image quality improving processing, and gain processing for improving an acquired light amount as a signal level. The image processing unit 208 performs processing of outputting a reset signal that clears accumulated charges in the image sensors 201 and 205. The image processing unit 208 performs an exposure control for adjusting a light amount incident on the image sensors 201 and 205 by changing the shutter speed, F-number (aperture value), and the settings of gain processing. The image processing unit 208 supplies the processed image data to the control unit 220.

The second imaging unit 102 includes an imaging optical system 210, an image sensor 211, a driving unit 212, a position detecting unit 213, and an image processing unit 214. The imaging optical system 210 includes a zoom lens, a focus lens, a diaphragm mechanism, and the like. The image sensor 211 photoelectrically converts the object image formed by the imaging optical system 210, and supplies the obtained electric signal to the image processing unit 214. The image processing unit 214 serves to provide processing similar to that of the image processing unit 208. The driving unit 212 drives various motors (not shown) for controlling the pan, tilt, and operation of the zoom lens in accordance with the control signal from the control unit 220. In this embodiment, the driving unit 212 is automatically controlled by driving the motor, but the present invention is not limited to this embodiment. The imaging direction (optical axis direction) and the optical zoom magnification of the second imaging unit 102 can be varied by the driving unit 212.

The memory 230 is, for example, a nonvolatile memory such as a flash memory and a hard disk drive. The memory 230 stores information on the set angle of the first imaging unit 101, coordinate information of the area designated by the terminal 120, and the like. The stored information is used for the processing of the control unit 220.

The NW communication unit 240 is an interface for communicating with the network 110. The communication between the NW communication unit 240 and the network 110 may be wired or wireless.

The control unit 220 includes a driving control unit (driving unit) 221, an image display generation unit 222, a communication control unit 223, an angle acquisition unit 224, a frame generation unit 225, an angle conversion unit (setting unit) 226, and a coding unit 227, and a command interpretation unit 228. The control unit 220 includes, for example, a CPU (Central Processing Unit), a ROM for storing a program executed by the CPU, and a RAM used as a work area for the CPU. Processing units designated by reference numerals 221 to 228 are realized by the CPU that executes the program. However, some may be implemented with dedicated hardware.

The driving control unit 221 generates a driving signal for controlling the pan, tilt, and the zoom magnification of the driving unit 212 in the second imaging unit 102. The driving unit 212 drives various unillustrated motors for panning, tilting, and moving the zoom lens based on the driving signal generated by the driving control unit 221. The driving control unit 221 also controls focusing, diaphragm, and the like by the first and second imaging units 101 and 102. The driving control unit 221 serves as a control unit configured to control the second imaging unit 102 to instruct the second imaging unit 102 to image the second imaging range and to acquire a second image by changing at least one of the imaging direction and the angle of view of the second imaging unit 102.

The image display generation unit 222 determines how data from the image processing units 208 and 214 are displayed on the terminal 120. In particular, it designates a display method of the first imaging unit 101, such as an arrangement of a plurality of images acquired from a plurality of image sensors (where the plurality of images are displayed) and the image preparation order specified when the plurality of images are joined together. The image display generation unit 222 performs digital zoom processing for cutting an area from the acquired image and scaling up and down into a desired display size.

The communication control unit 223 transmits the coded data generated by the coding unit 227 to the terminal 120 via the NW communication unit 240. The communication control unit 223 transmits an image obtained from the second imaging unit 102 and a wide-range image obtained from the first imaging unit 101 in a proper layout. When the communication control unit 223 receives various request commands from the terminal 120 via the NW communication unit 240, the communication control unit 223 notifies the command interpretation unit 228 of the received request commands.

The angle acquisition unit 224 determines a direction of each image sensor using the electric signals output from the position detecting units 203 and 207 in the first imaging unit 101, and transmits the determination result to the memory 230. The angle acquisition unit 224 serves as an acquisition unit configured to acquire information on a rotation of the first imaging unit 101 in the rotation direction and position information of a designated range designated on a first image imaged by the first imaging unit.

The frame generation unit 225 generates (draws) an area frame surrounding a designated area designated by the terminal 120 on the images acquired from the first and second imaging units 101 and 102. The frame generation unit 225 generates the area frame by calculating the coordinate of the designated area on the image by setting the horizontal direction of the image to the X coordinate and the vertical direction to the Y coordinate. When the frame generation unit 225 generates the area frame on the image acquired from the first imaging unit 101, the designated area is displayed by the pan, tilt, and zoom operations of the second imaging unit 102. When the frame generation unit 225 generates the area frame on the image acquired from the second imaging unit 102, the designated area is displayed by the zoom operation of the second imaging unit 102.

The angle conversion unit 226 instructs the frame generation unit 225 to reform a frame using the information acquired by the angle acquisition unit 224, the information generated by the frame generation unit 225, and a relationship between the first and second imaging units 101 and 102. The angle conversion unit 226 serves as a setting unit configured to set the second imaging range so as to include the designated range based on the information on the rotation and the position information.

The coding unit 227 encodes the image data acquired from the image processing units 208 and 214 and generates coded data. The coded data is transmitted to the communication control unit 223.

The command interpretation unit 228 analyzes the request command notified from the communication control unit 223 and executes processing according to the request command. For example, when a predetermined area in an image acquired from the first imaging unit 101 is designated by the terminal 120, the command interpretation unit 228 instructs the driving control unit 221 so that the second imaging unit 102 images the same area as the designated area.

Figure 3:
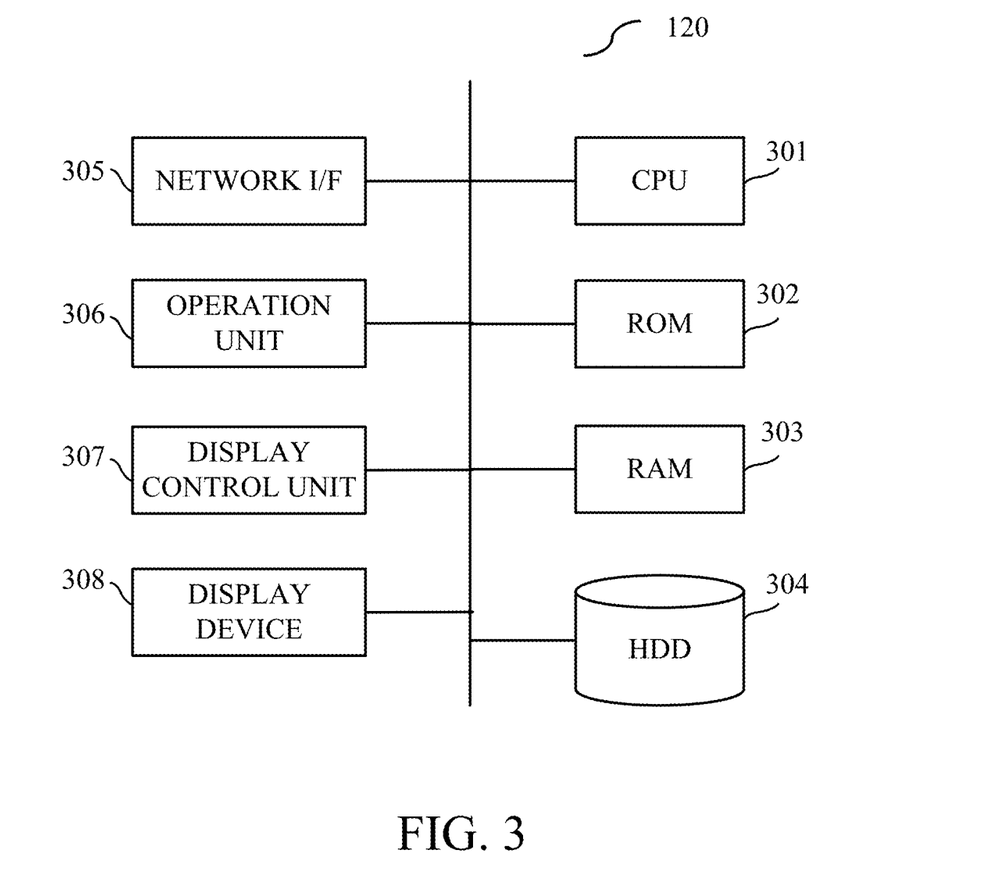
FIG. 3 is a block diagram of a terminal according to the first embodiment.

Referring now to FIG. 3, a description will be given of an internal configuration of the terminal 120. FIG. 3 is a block diagram of the terminal 120.

The terminal 120 is an information processing apparatus typified by a personal computer. The terminal 120 includes a CPU 301 that controls the entire terminal, a ROM 302 that stores a BIOS and a boot program, and a RAM 303 that stores an OS (operating system), a camera application, and the like, and serves as a work area. The terminal 120 further includes an HDD 304 for storing the OS, a camera application, and the like, and a network I/F 305 for communicating with the network 110. The terminal 120 further includes an operation unit 306 including a keyboard, a mouse, a touch panel, and the like for inputting an instruction from the user. The terminal 120 further includes a display control unit 307 and a display device 308.

When the terminal 120 is powered on, the CPU 301 loads the OS from the HDD 304 to the RAM 303 and executes it according to the boot program stored in the ROM 302. Thereby, the terminal 120 serves as an information processing apparatus. As a result, the operation unit 306 and the display device 308 serves as user interfaces. The user operates the operation unit 306 to instruct the execution of the camera application program, so that the camera application is loaded from the HDD 304 into the RAM 303 and then executed. Thereby, the terminal 120 serves as an apparatus for displaying the image acquired from the image pickup apparatus 100.

Figure 4:
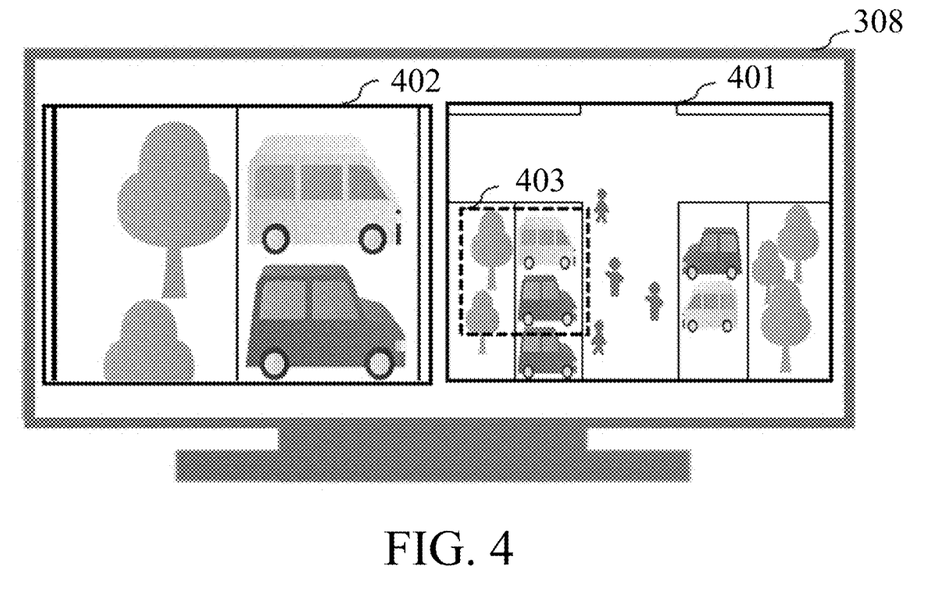
FIG. 4 illustrates an illustrative screen that displays an image acquired from the image pickup apparatus according to the first embodiment, on a display device in the terminal.

FIG. 4 illustrates an illustrative screen that displays the image acquired from the image pickup apparatus 100 according to this embodiment, on the display device 308 in the terminal 120. The display device 308 displays a first image 401 acquired from the first imaging unit 101 and a second image 402 acquired from the second imaging unit 102. An area 403 surrounded by a broken line in the first image 401 indicates a designated area to be enlarged and displayed by the second imaging unit 102. That is, in the second image 402, the second imaging unit 102 provides the pan, tilt, and zoom processing and displays the area 403 in the first image 401.

For description convenience, the first image 401 is displayed as an image acquired from one of a plurality of image sensors provided in the first imaging unit 101, but actually displayed as images acquired from the plurality of image sensors. The image actually displayed is generated by the image display generation unit 222. For example, when there are four image sensors, the first image 401 may be displayed as four images, or may be displayed as one wide-angle image in which the images acquired from the image sensors are joined together.

When the first imaging unit 101 pans and tilts, an imaging range that can be captured by the first imaging unit 101 can be covered if the second imaging unit 102 also pans and tilts. That is, acquiring the coordinate information of the area 403 enables the second imaging unit 102 to image the area 403.

When the first imaging unit 101 rotates in the rotation direction (performs the rotation operation), the area 403 cannot be displayed on the second imaging unit 102 using the coordinate information of the first image 401. In addition, a shift caused by the rotation generated by the rotation operation cannot be compensated.

Figure 5:
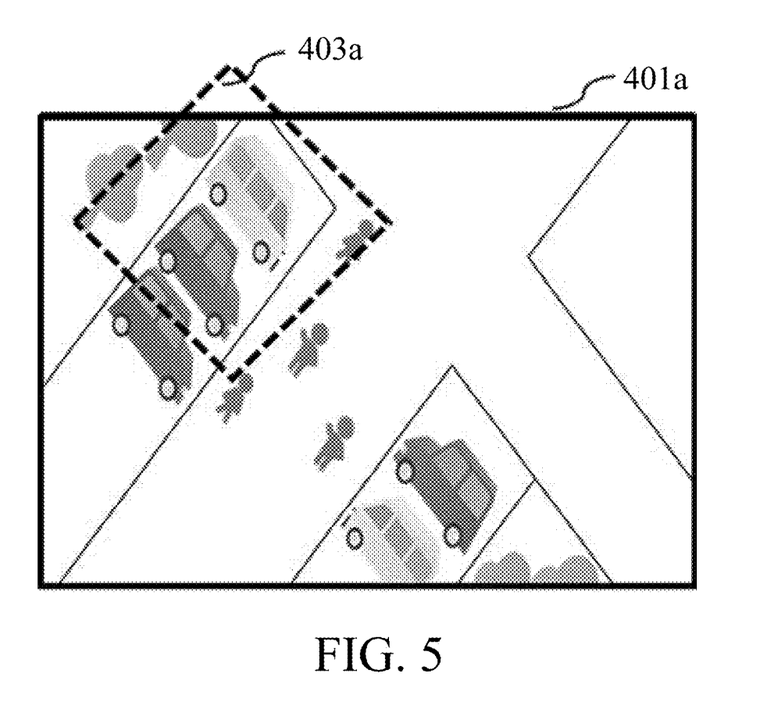
FIG. 5 illustrates a first image before a rotation operation.

FIG. 5 illustrates an image 401a before the rotation operation of the first image 401, which is acquired by the first imaging unit 101 performing the rotation operation at an angle of 45'. When the user designates the area 403 using the display device 308, it means that the area 403a in FIG. 5 is actually designated. Since the second imaging unit 102 cannot perform the rotation operation, the area 403a cannot be represented. That is, the second image 402 shows that the vehicle tilts by 45°.

Figure 6:
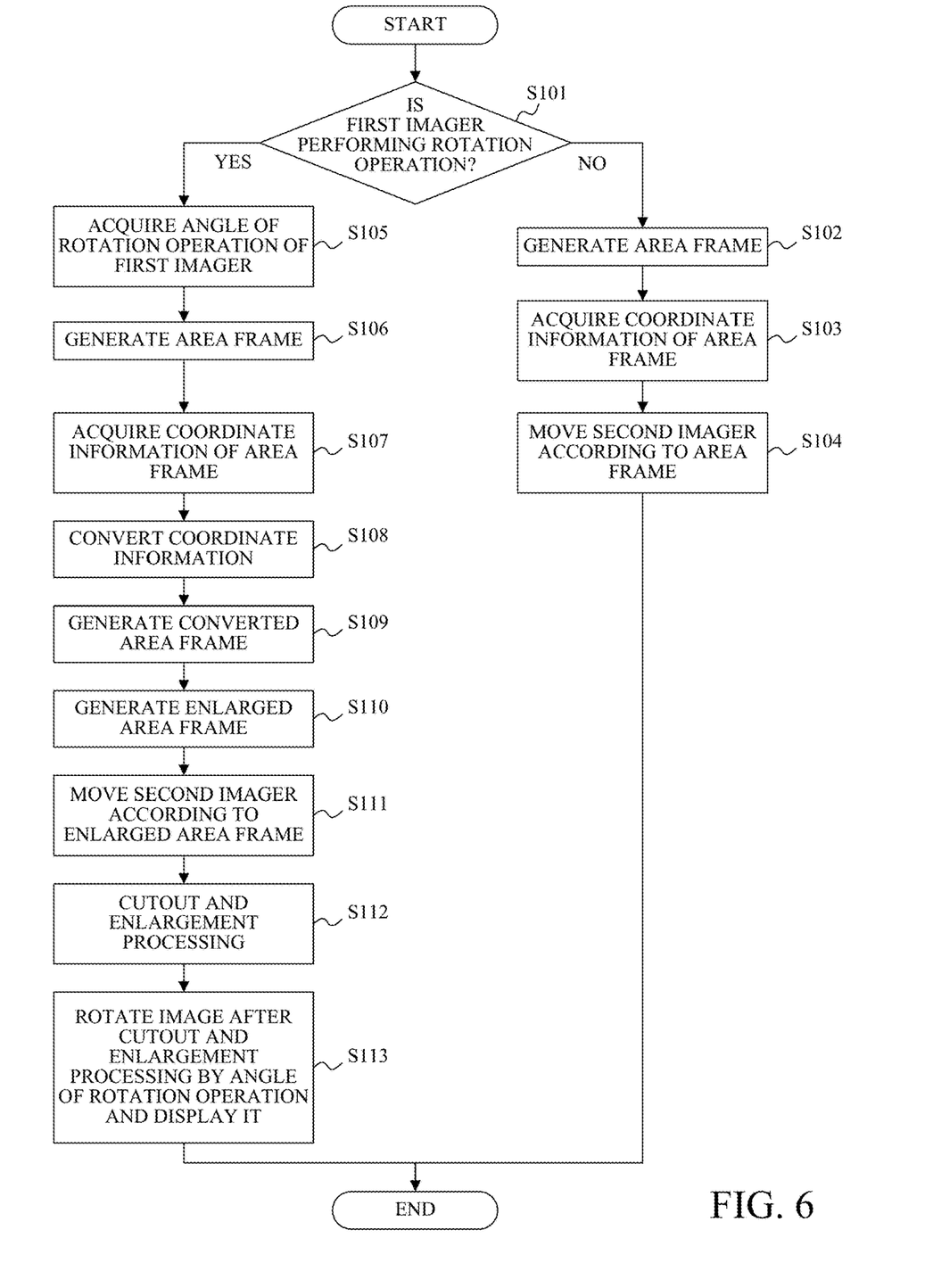
FIG. 6 is a flowchart showing a control method of a second imaging unit when a first imaging unit performs the rotation operation in the first embodiment.

A description will now be given of a control method of the second imaging unit 102 when the first imaging unit 101 according to this embodiment rotates in the rotation direction. FIG. 6 is a flowchart showing the control method of the second imaging unit 102 when the first imaging unit 101 according to this embodiment rotates in the rotation direction.

In the step S101, the control unit 220 (angle acquisition unit 224) determines whether or not the first imaging unit 101 is performing the rotation operation using the electric signals acquired from the position detecting units 203 and 207. If it is determined that the first imaging unit 101 is performing the rotation operation, the flow proceeds to the step S105, otherwise the flow proceeds to the step S102.

In the step S102, the control unit 220 (frame generation unit 225) generates an area frame (corresponding to a frame surrounding the area 403 in FIG. 4) on the first image 401 acquired from the first imaging unit 101.

In the step S103, the control unit 220 acquires the coordinate information of the area frame generated in the step S102. The acquired coordinate information is stored in the memory 230.

In the step S104, the control unit 220 moves the second imaging unit 102 so as to image the area corresponding to the area frame generated in the step S102. In this embodiment, the control unit 220 makes the second imaging unit 102 pan, tilt, and zoom based on the relationship between the coordinate information of the area frame and the first and second imaging units 101 and 102 acquired in advance. The image acquired by the second imaging unit 102 is displayed as the second image 401 on the display device 308. For example, information on the initial angle of view of the first imaging unit 101 and information on the setting of the second imaging unit 102 in the frame generation may be stored in the memory 230, and it may be moved from the setting of the second imaging unit 102 in the frame generation using a shift of an angle of view in the frame generation from the initial angle of view.

In the step S105, the control unit 220 (angle acquisition unit 224) acquires the angle of the rotation operation of the first imaging unit 101 (information on the rotation in the rotation operation) using the electric signals acquired from the position detecting units 203 and 207.

In the step S106, the control unit 220 (frame generation unit 225) generates an area frame (corresponding to a frame surrounding the area 403 in FIG. 4) on the first image 401 acquired from the first imaging unit 101. The area 403 is an area in which the rotation operation of the first imaging unit 101 is reflected.

In the step S107, the control unit 220 acquires the coordinate information of the area frame generated in the step S106.

In the step S108, the control unit 220 (angle conversion unit 226) converts the coordinate information acquired in the step S107 using the angle of the rotation operation and the relationship between the first and second imaging units 101 and 102.

In the step S109, the control unit 220 (angle conversion unit 226) generates an area frame (converted area frame hereinafter) on the first image 401 acquired from the first imaging unit 101 using the converted coordinates.

In the step S110, the control unit 220 generates an enlarged area frame in which the second imaging unit 102 can move from the converted area frame generated in the step S109.

In the step S111, the control unit 220 moves the second imaging unit 102 so as to capture an area corresponding to the enlarged area frame generated in the step S110.

In the step S112, the control unit 220 (image display generation unit 222) cuts out an area corresponding to the converted area frame from the image acquired from the second imaging unit 102 after the movement, and performs enlargement processing so that the cut out area is as large as the second image 402.

In the step S113, the control unit 220 (image display generation unit 222) rotates the image processed in the step S112 by the angle of the rotation operation acquired in the step S105 (executes the rotation processing) and displays the result on the display device 308.

Figure 7A:
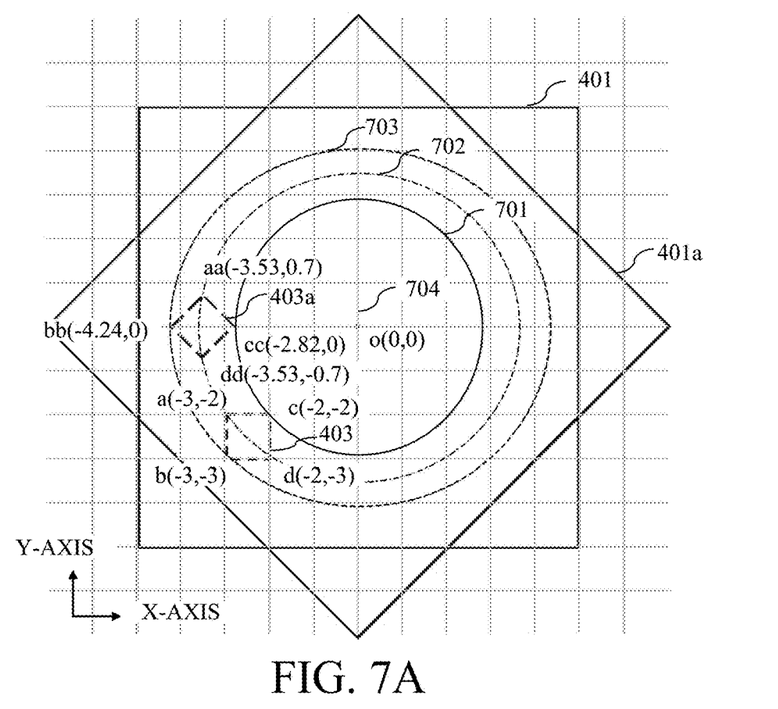
FIGS. 7A and 7B explain settings of a designated area in the first embodiment.
Figure 7B:
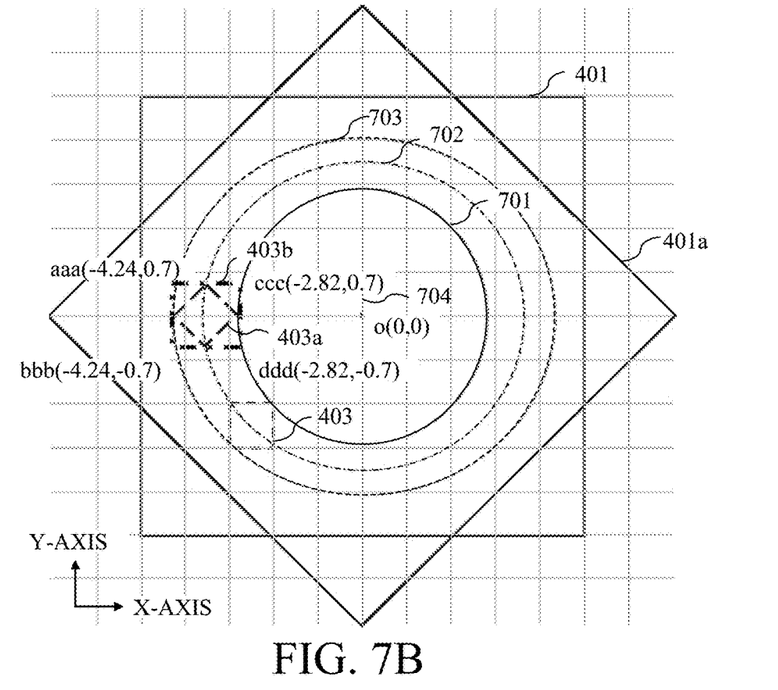

Referring now to FIGS. 7A and 7B, a description will be given of a method of designating an area. FIGS. 7A and 7B explain the setting of the designated area. FIGS. 7A and 7B assume the rotation operation of the first imaging unit 101 by 45° around a center point 704 as the optical axis center indicated by a first coordinate o(0, 0), where the X-axis is set to the horizontal direction, the Y-axis is set to the vertical direction, and one square in the figure is set to one pixel.

FIG. 7A shows, in an superimposition manner, the image 401a and the area 403a before the rotation operation and the first image 401 and the area 403 after the rotation operation. Coordinates of vertices a to d in the area 403 are a(−3, −2), b(−3, −3), c(−2, −2), and d(−2, −3), respectively, and correspond to coordinate information acquired in the step S107 in FIG. 6. Coordinates of vertices as to dd in the area 403a are aa(−3.53, 0.7), bb(−4.24, 0), cc(−2.82, 0), and dd(−3.53, −0.7), respectively, and are coordinates of the converted area frame generated in the step S109 in FIG. 6.

The vertices aa and dd are points where the vertices a and d in the area 403 are rotated around the center point 704 by 45° on the coaxial circle indicated by an alternate long and short dash line 702, respectively. The vertex cc is a point where the vertex c in the area 403 is rotated around the center point 704 on the coaxial circle indicated by a dotted line 701 by 45°. The vertex bb is a point where the vertex b in the area 403 is rotated around the center point 704 on a coaxial circle indicated by a broken line 703 by 45°. Each coordinate of the vertices aa to dd is calculated by the three-square theorem.

FIG. 7B shows an area 403b that is made by connecting points to which the vertices of the area 403a are moved by the maximum amount when the second imaging unit 102 performs pan, tilt, and zoom operations, in addition to the display of FIG. 7(a). Coordinates of vertices aaa to ddd in the area 403b are aaa(−4.24, 0.7), bbb(−4.24, −0.7), ccc(−2.82, 0.7), and ddd(−2.82, −0.7), respectively. The area 403b includes the area 403a, and the outer circumference of the area 403b is an enlarged area frame generated in the step S110 in FIG. 6.

As described above, according to this embodiment, even when the first imaging unit 101 rotates, the steps S111 to S113 in FIG. 6 enable the second imaging unit 102 to image an area corresponding to a designated area on the first image 401.

While this embodiment sets the angle of the rotation operation to 45°, the present invention is not limited to this embodiment. Even when a plurality of first imaging units 101 are provided, they can be individually controlled. When the angles of the rotation operation are 90°, 180°, and 270°, the compatible image sensor 211 may change the read direction.

Modification

It is not always necessary to generate an area frame (converted area frame) or an enlarged area frame.

When the area frame (converted area frame) and the enlarged area frame are not generated, the coordinate information of the enlarged area to be imaged by the second imaging unit 102 is acquired from the converted coordinates acquired in the step S108. Then, in the step S111 the second imaging unit 102 images an area corresponding to the coordinate information of the enlarged area. That is, after the coordinate conversion in the step S108, the steps S109 and S110 are skipped, and instead, the coordinate information of the enlarged area to be imaged by the second imaging unit 102 is acquired from the converted coordinates acquired in the step S108. Then, the flow proceeds to the step S110.

Second Embodiment

An image pickup apparatus according to this embodiment has the same configuration as that of the image pickup apparatus of the first embodiment. This embodiment will discuss differences m the first embodiment, and a description of common parts will be omitted.

This embodiment will discuss a configuration that superimposes an image indicating an area of the second image 402 onto the first image 401. This embodiment intends, when the second image 402 is acquired, to acquire a high-resolution image with only optical zooming without the cutout processing or the rotation processing, and to make a shift in the rotation between the first and second imaging units 101 and 102 more easily visually recognizable.

Figure 8:
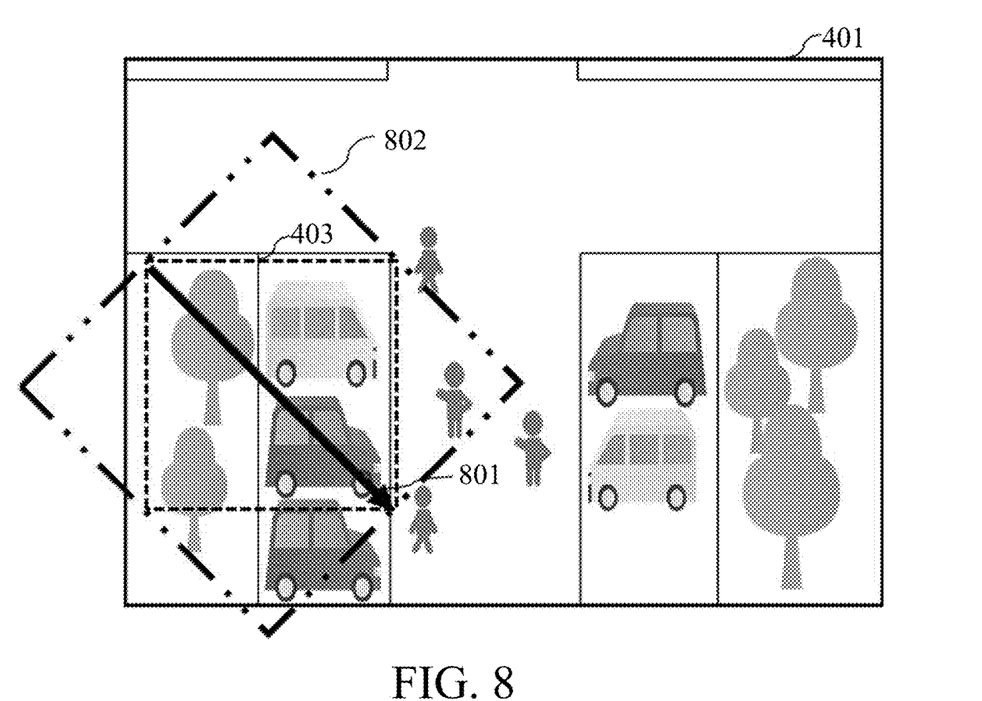
FIG. 8 illustrates an illustrative first image according to a second embodiment.

FIG. 8 illustrates an example of the first image 401 acquired from e first imaging unit 101 according to this embodiment. In this embodiment, the angle of the rotation operation of the first imaging unit 101 is 45°. FIG. 8 illustrates on the first image 401 that the area is designated by the mouse in the operation unit 306 of the terminal 120 in forming the area 403. An arrow 801 starts at a point where the mouse is clicked, and ends at a point where the mouse that is being clicked is moved to a predetermined position and then the click is released. Determining the direction and size of the arrow 801 by this drag-and-drop processing can form the area 403.

This embodiment displays, on the first image 401, an area 802 (enlarged area frame) surrounded by an alternate long and two short dashes line, which is an imaging area of the second imaging unit 102 in consideration of the rotation of the first imaging unit 101. The area 802 is offset by 45° from the area 403 and so large that it includes the area 403. The area 802 may be displayed according to the action of pulling the arrow 801 with the mouse during the drag-and-drop processing, or may be displayed after the drag-and-drop processing is completed.

Figure 9:
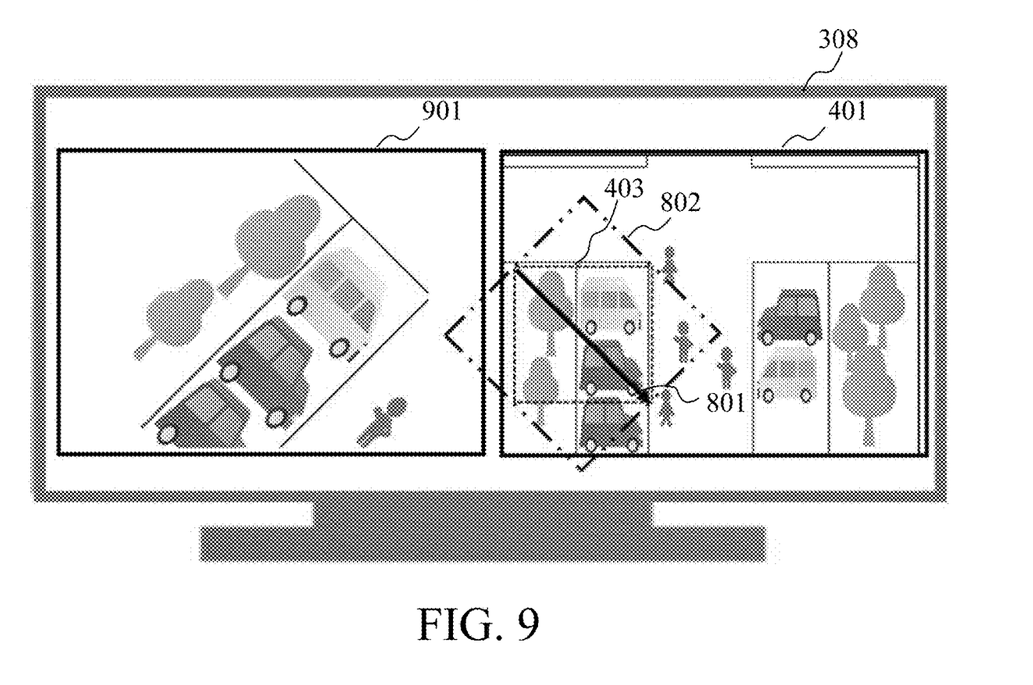
FIG. 9 illustrates an illustrative image displayed on a display device according to the second embodiment.

FIG. 9 illustrates an example of an image displayed on the display device 308 according to this embodiment. In an area adjacent to the first image 402, the second image 901 acquired by imaging the area 802 is displayed. In the configuration according to this embodiment, a car in the first image 401 is displayed and shifted by 45° from a car in a second image 901. The second image 901 is a high-resolution image since no digital zoom processing is performed for it.

As described above, the configuration according to this embodiment superimposes the image indicating the area 802 of the second image 402 acquired from the second imaging unit 102 onto the first image 401. This configuration provides a high-resolution image and a shift in the rotation between the first and second imaging units 101 and 102 to be visually expressed.

The user may be able to select a display of the second image with the first image in consideration of the rotation operation or a display of only optical zooming. As a method of converting the angle of the rotation operation, if there is already a calculated value of the same angle, it may be shared with another imaging unit.

Each embodiment provides a control apparatus (220) for a first imaging unit (101) rotatable in a rotation direction around an optical axis and configured to image a first imaging range, and a second imaging unit (102) configured to change at least one of an imaging direction and an angle of view and to image a second imaging range that is part of the first imaging range. The control apparatus includes an acquisition unit (224) configured to acquire information on a rotation of the first imaging unit in the rotation direction and position information of a designated range (403) designated on a first image (401) imaged by the first imaging unit, a setting unit (226) configured to set the second imaging range so as to include the designated range based on the information on the rotation and the position information, and a control unit (221) configured to control the second imaging unit to instruct the second imaging unit to image the second imaging range and to acquire a second image (402) by changing at least one of the imaging direction and the angle of view of the second imaging unit. At least one processor or circuit is configured to perform a function of at least one of the units.

The setting unit may set the second imaging range using position information of an area corresponding to the designated range on an image that can be acquired before the first imaging unit rotates in the rotation direction. The second image may be acquired by cutout processing on an image acquired by imaging the second imaging range and rotation processing based on the information on the rotation, according to the designated range. An image of the second imaging range may be superimposed on the first image. A size of an image of the second imaging range may be changed by a user operation. The second imaging unit may not be able to rotate in the rotation direction.

Each embodiment provides a control method for a first imaging unit (101) rotatable in a rotation direction around an optical axis and configured to image a first imaging range, and a second imaging unit (102) configured to change at least one of an imaging direction and an angle of view and to image a second imaging range that is part of the first imaging range. The control method includes the steps of acquiring information on a rotation of the first imaging unit in the rotation direction (S105) and position information of a designated range (403) designated on a first image (401) imaged by the first imaging unit (S107), setting (S108-S110) the second imaging range so as to include the designated range based on the information on the rotation and the position information, and controlling (S113) the second imaging unit to instruct the second imaging unit to image the second imaging range and to acquire a second image (402)

by changing at least one of the imaging direction and the angle of view of the second imaging unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-109491, filed on Jun. 25, 2020, which is hereby incorporated by reference herein in its entirety.

What is claimed is:

1. A control apparatus for a first imaging unit rotatable in a rotation direction around an optical axis and configured to image a first imaging range, and a second imaging unit configured to change at least one of an imaging direction and an angle of view and to image a second imaging range that is part of the first imaging range, wherein the second imaging unit cannot rotate in the rotation direction, the control apparatus comprising:
an acquisition unit configured to acquire information on a rotation of the first imaging unit in the rotation direction and position information of a designated range designated on a first image imaged by the first imaging unit;
a setting unit configured to set the second imaging range so as to include the designated range based on the information on the rotation and the position information; and
a control unit configured to control the second imaging unit to image the second imaging range by changing at least one of the imaging direction and the angle of view of the second imaging unit and to acquire a second image,
wherein at least one processor or circuit is configured to perform a function of at least one of the units.

2. The control apparatus according to claim 1, wherein the setting unit sets the second imaging range using position information of an area corresponding to the designated range on an image that can be acquired before the first imaging unit rotates in the rotation direction.

3. The control apparatus according to claim 1, wherein the second image is acquired by cutout processing on an image acquired by imaging the second imaging range and rotation processing based on the information on the rotation, according to the designated range.

4. The control apparatus according to claim 1, wherein an image indicating an area of the second imaging range is superimposed on the first image.

5. The control apparatus according to claim 4, wherein a size of the image indicating the area of the second imaging range is changed by a user operation.

6. A control method for a first imaging unit rotatable in a rotation direction around an optical axis and configured to image a first imaging range, and a second imaging unit configured to change at least one of an imaging direction and an angle of view and to image a second imaging range that is part of the first imaging range, wherein the second imaging unit cannot rotate in the rotation direction, the control method comprising the steps of:
acquiring information on a rotation of the first imaging unit in the rotation direction and position information of a designated range designated on a first image imaged by the first imaging unit;
setting the second imaging range so as to include the designated range based on the information on the rotation and the position information; and
controlling the second imaging unit to image the second imaging range by changing at least one of the imaging direction and the angle of view of the second imaging unit and to acquire a second image.

7. A non-transitory computer-readable storage medium storing a computer program that causes a computer to execute the control method according to claim 6.

* * * * *